United States Patent
Zhang et al.

(10) Patent No.: US 11,783,533 B2
(45) Date of Patent: Oct. 10, 2023

(54) FRAME EXTRAPOLATION WITH APPLICATION GENERATED MOTION VECTOR AND DEPTH

(71) Applicant: META PLATFORMS TECHNOLOGIES, LLC, Menlo Park, CA (US)

(72) Inventors: Jian Zhang, Fremont, CA (US); Xiang Wei, Palo Alto, CA (US); David James Borel, San Francisco, CA (US); Matthew Robert Fulghum, Saratoga, CA (US); Neel Bedekar, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/590,682

(22) Filed: Feb. 1, 2022

(65) Prior Publication Data
US 2023/0115057 A1 Apr. 13, 2023

Related U.S. Application Data

(60) Provisional application No. 63/254,476, filed on Oct. 11, 2021.

(51) Int. Cl.
*G06T 15/20* (2011.01)
*G06T 7/70* (2017.01)
(Continued)

(52) U.S. Cl.
CPC ............ *G06T 15/20* (2013.01); *G06T 7/20* (2013.01); *G06T 7/50* (2017.01); *G06T 7/70* (2017.01);
(Continued)

(58) Field of Classification Search
None
See application file for complete search history.

(56) References Cited

U.S. PATENT DOCUMENTS

| 10,595,000 B1 * | 3/2020 | Beeler .................. G06T 15/205 |
| 2009/0285306 A1 * | 11/2009 | Leonardi .............. H04N 19/615 |
| | | 375/E7.076 |
| 2014/0192157 A1 | 7/2014 | Chen et al. |
| 2020/0410740 A1 | 12/2020 | Croxford et al. |
| 2021/0142575 A1 | 5/2021 | Taylor et al. |

FOREIGN PATENT DOCUMENTS

| EP | 1612738 A2 | 1/2006 |
| WO | 9724000 A1 | 7/1997 |

OTHER PUBLICATIONS

The Khronos Group Inc., "The OpenXR Specification," Copyright (c) 2017-2022, Version 1.0.22: from git ref release-1.0.22, 837 pages, Retrieved from internet: https://www.khronos.org/registry/OpenXR/specs/1.0/html/xrspec.html#XR_FB_space_warp.

(Continued)

*Primary Examiner* — Frank S Chen
(74) *Attorney, Agent, or Firm* — Baker Botts L.L.P.

(57) ABSTRACT

In one embodiment, a method includes receiving a rendered image, motion vector data, and a depth map corresponding to a current frame of a video stream generated by an application, calculating a current three-dimensional position corresponding to the current frame of an object presented in the rendered image using the depth map, calculating a past three-dimensional position of the object corresponding to a past frame using the motion vector data and the depth map, estimating a future three-dimensional position of the object corresponding to a future frame based on the past three-dimensional position and the current three-dimensional position of the object, and generating an extrapolated image corresponding to the future frame by reprojecting the object presented in the rendered image to a future viewpoint (Continued)

associated with the future frame using the future three-dimensional position of the object.

18 Claims, 8 Drawing Sheets

(51) Int. Cl.
*G06T 7/50* (2017.01)
*G06T 17/20* (2006.01)
*G06T 7/20* (2017.01)
(52) U.S. Cl.
CPC .... *G06T 17/20* (2013.01); *G06T 2207/10016* (2013.01)

(56) References Cited

OTHER PUBLICATIONS

Wikipedia: "Motion Blur," [Online], Retrieved on Mar. 8, 2022, 7 pages, Retrieved from internet: https://en.wikipedia.org/wiki/Motion_blur.
Wikipedia: "Temporal Anti-Aliasing," [Online], Retrieved on Mar. 8, 2022, 2 pages, Retrieved from internet: https://en.wikipedia.org/wiki/Temporal_anti-aliasing.
International Search report and Written Opinion for International Application No. PCT/US2022/044759, dated Dec. 20, 2022, 9 pages.

\* cited by examiner

FRAME EXTRAPOLATION WITH APPLICATION GENERATED MOTION VECTOR AND DEPTH

PRIORITY

This application claims the benefit under 35 U.S.C. § 119(e) of U.S. Provisional Patent Application No. 63/254,476, filed 11 Oct. 2021, which is incorporated herein by reference.

TECHNICAL FIELD

This disclosure generally relates to artificial-reality systems, and in particular, related to extrapolating frames.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for generating high-quality frame extrapolation and reprojection by using application-generated motion vectors and a depth map. To provide a comfortable artificial reality experience to a user, rendering high resolution frames at a high frame rate is required. However, this is a huge challenge for mobile HMD due to computing power limitations on the hardware. Traditional time warp solutions used in artificial reality systems have several limitations: the solutions only correct for rotational but not translational movement and does not address animation stutters. Traditional time warp solutions simply rotate a two-dimensional RGB image to accommodate the user's new viewpoint. The traditional frame extrapolation solutions are based on lower quality motion vectors because the motion vectors are estimated from two-dimensional images. A novel frame extrapolation solution, disclosed herein, may account for translational movement as well as rotational movement. The novel frame extrapolation solution may utilize motions vectors and depth information generated by an application based on rendered objects.

In particular embodiments, a computing system associated with a wearable device may receive a rendered image, motion vector data, and a depth map corresponding to a current frame generated by an application. The motion vector data and the depth map may be generated based on three-dimensional objects rendered by the application. Motion vectors in the motion vector data may be three-dimensional. The computing system may process the received motion vector data and the depth map such that regions corresponding to foreground of the rendered image are expanded. The computing system may calculate a current three-dimensional position of an object presented in the rendered image corresponding to the current frame using the depth map. The computing system may, in order to calculate the current three-dimensional position of the object, inversely project the depth map onto a three-dimensional space from a current viewpoint associated with the current frame. The current viewpoint may be associated with a position and an orientation of the wearable device at a time instance when the current frame is rendered. The computing system may calculate a past three-dimensional position of the object corresponding to a past frame using the motion vector data and the depth map. To calculate the past three-dimensional position of the object, the computing system may generate an estimated depth map corresponding to the past frame by subtracting the motion vectors from the depth map. The computing system may inversely project the estimated depth map onto a three-dimensional space from a past viewpoint associated with the past frame. The computing system may estimate a future three-dimensional position of the object corresponding to a future frame based on the past three-dimensional position and the current three-dimensional position of the object. Estimating the future three-dimensional position of the object may be performed based on an assumption that the object moves at a constant speed from a time instance corresponding to the past frame to a time instance corresponding to the future frame. The computing system may perform a linear interpolation to estimate the future three-dimensional position of the object. After estimating the future three-dimensional position of the object, the computing system may generate a distortion mesh by projecting the estimated future three-dimensional position of the object onto the future viewpoint. The computing system may generate an extrapolated image corresponding to the future frame by reprojecting the object presented in the rendered image to a future viewpoint associated with the future frame using the future three-dimensional position of the object. To generate the extrapolated image, the computing system may apply the distortion mesh to the rendered image.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
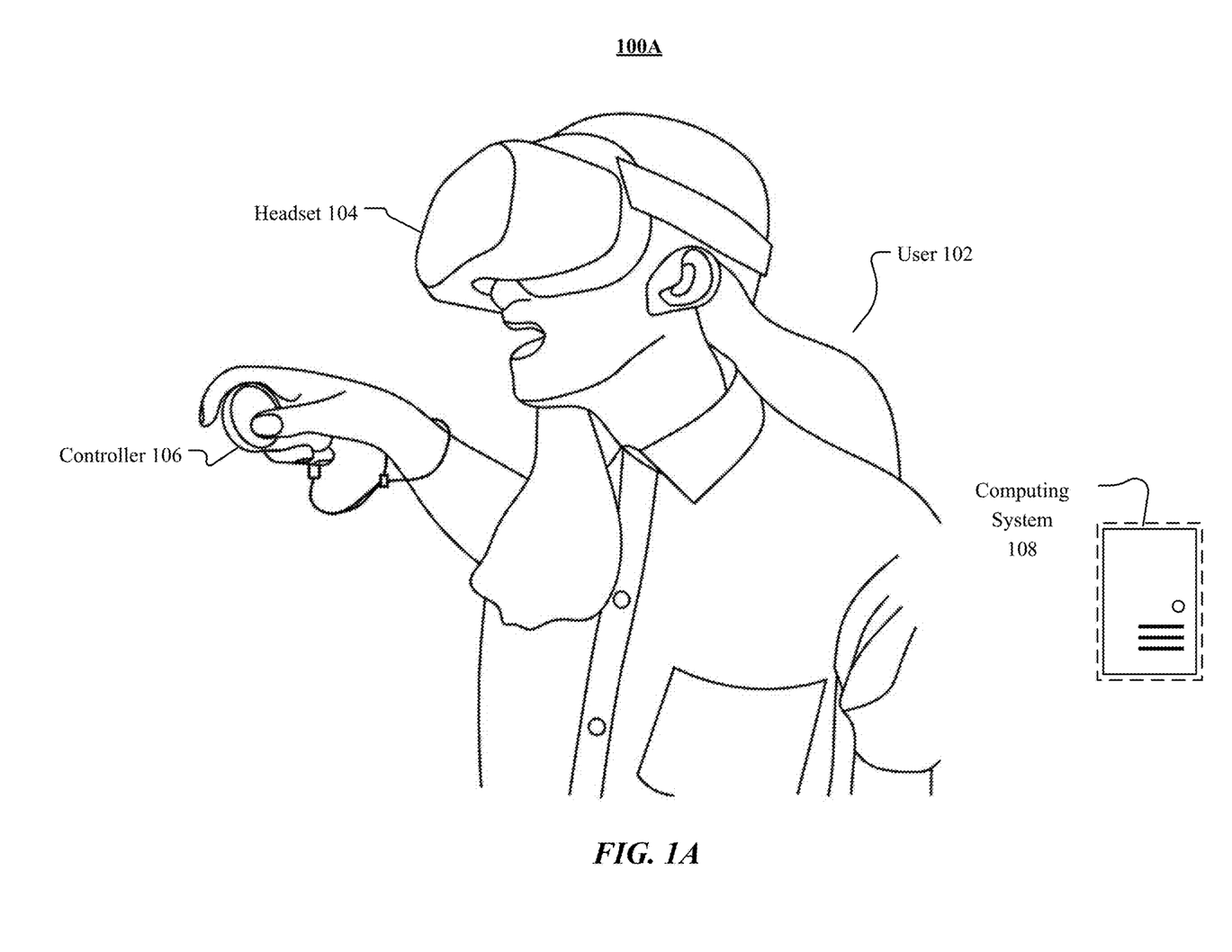
FIG. 1A illustrates an example artificial reality system.

FIG. 1A illustrates an example artificial reality system 100A. In particular embodiments, the artificial reality system 100A may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may include a microphone to capture voice input from the user 102. The headset 104 may be referred as a head-mounted display (HMD). The controller 106 may comprise a trackpad and one or more buttons. The controller 106 may receive inputs from the user 102 and relay the inputs to the computing system 108. The controller 106 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computing system, an on-board computing system integrated with the headset 104, a mobile device, or any other hardware platform capable of providing artificial reality content to and receiving inputs from the user 102.

Figure 1B:
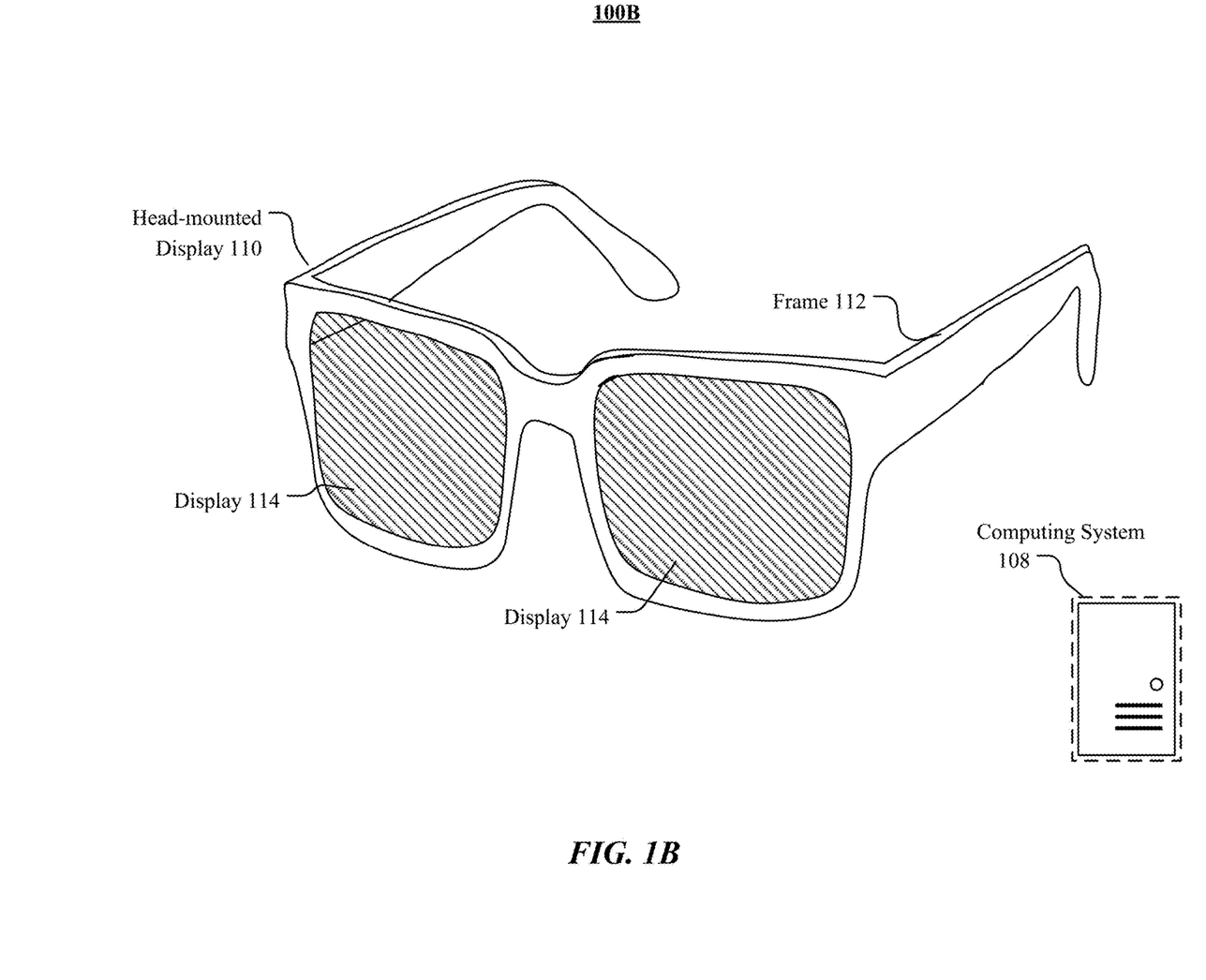
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 108. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The HMD 110 may include a microphone to capture voice input from the user. The augmented reality system 100B may further include a controller comprising a trackpad and one or more buttons. The controller may receive inputs from users and relay the inputs to the computing system 108. The controller may also provide haptic feedback to users. The computing system 108 may be connected to the HMD 110 and the controller through cables or wireless connections. The computing system 108 may control the HMD 110 and the controller to provide the augmented reality content to and receive inputs from users. The computing system 108 may be a standalone host computer device, an on-board computer device integrated with the HMD 110, a mobile device, or any other hardware platform capable of providing artificial reality content to and receiving inputs from users.

Figure 2:
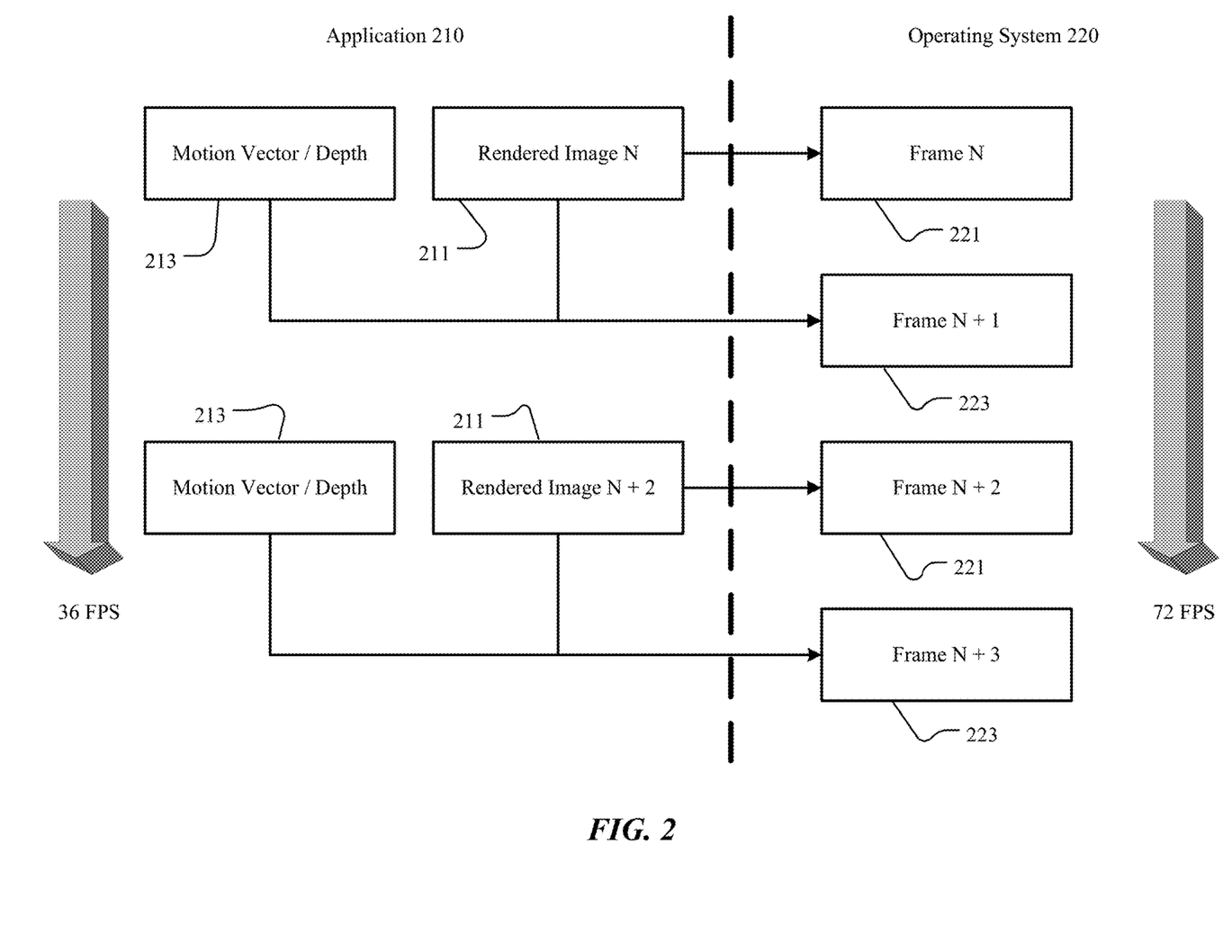
FIG. 2 illustrates an example overview of the frame extrapolation and reprojection using application-generated motion vectors and depth information.

FIG. 2 illustrates an example overview of the frame extrapolation and reprojection using application-generated motion vectors and depth information. In an example illustrated in FIG. 2, an application 210 renders images for video frames at 36 frames per second (FPS). Thus, the application 210 renders images 211 for frame N and N+2. The application also generates motion vectors and depth information 213 corresponding to each image 211. An operating system 220 of the computing system 108 presents frames at 72 FPS to a user by using the frame extrapolation solution proposed herein. The operating system 220 presents images 211 rendered by the application 210 for the frame N and frame N+2 221 to a display associated with the computing system 108. The operating system 220 generates images 223 for frames N+1 and N+3 based on the rendered images 211 and the motion vectors and depth information 213 generated along with the rendered images 211. The operating system 220 presents the generated images 223 for frames N+1 and N+3 to the display. While performing high quality frame extrapolation using the motion vectors and depth information 213 may be important, latency caused by sampling half as often may impose significant impact on user experience. When the latency stays high, the user may experience significant black pulling when rotating the headset 104, or significant lagging when moving her controller. A number of techniques are proposed herein to reduce the potential latency: (1) The operating system 220 may delay a start of a frame to reduce an interval between a time instance when the application 210 finishes rendering an image and a time instance the image is consumed on the display. (2) The operating system 220 may re-fetch poses of the headset 104 and controllers 106 to fill a time gap between rendering an image and presenting the rendered image to the display. (3) The operating system 220 may resample the camera pose right before performing a time warp and reproject pixels based on consideration from both camera rotation and camera translation. This technique is called as positional time warp (PTW). The application-generated depth map may be used for the PTW. In particular embodiments, the head pose latency with PTW may be even lower than the head pose latency in equivalent full frame rate applications without using the frame extrapolation. In particular embodiments, a runtime system particularly responsible for the frame extrapolation may function instead of the operating system 220. Although this disclosure describes performing frame extrapolation at a particular rate, this disclosure contemplates performing frame extrapolation at any suitable rate.

In particular embodiments, an operating system 220 of a computing system 108 associated with an HMD 110 may receive a rendered image, motion vector data, and a depth map corresponding to a current frame generated by an application 210. In particular embodiments, the computing system 108 may comprise a runtime system particularly responsible for the frame extrapolation. In such a case, the runtime system may replace the operating system 220 for the procedures disclosed herein. Unlike the previous approaches, where the motion vector is estimated based on comparisons between two-dimensional images, the motion vector data and the depth map may be generated based on three-dimensional objects rendered by the application. Motion vectors in the motion vector data may be three-dimensional. The motion vector data may be generated using motion blur techniques, temporal anti-aliasing techniques, or any suitable techniques. Since a depth buffer is always used for a motion vector calculation, an overhead for generating the depth map may be small. In particular embodiments, the operating system 220 of the computing system 108 may process the received motion vector data and the depth map such that regions corresponding to foreground of the rendered image are expanded. Although this disclosure describes receiving a rendered image, motion vector data, and a depth map in a particular manner, this disclosure contemplates receiving a rendered image, motion vector data, and a depth map in any suitable manner.

Figure 3:
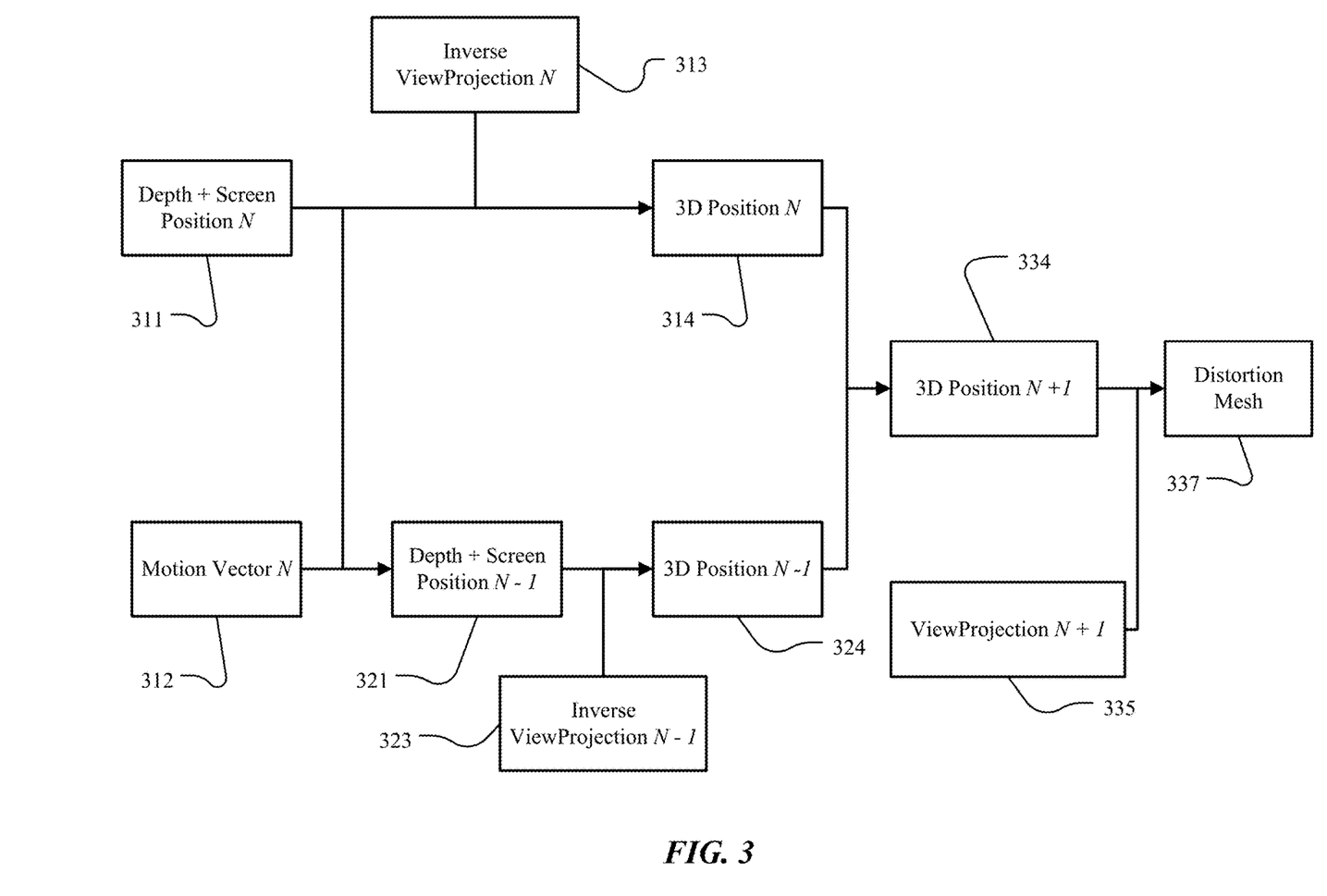
FIG. 3 illustrates an example data flow for frame extrapolation.

In particular embodiments, the operating system 220 of the computing system 108 may calculate a current three-dimensional position of an object presented in the rendered image corresponding to the current frame using the depth map. The operating system 220 of the computing system 108 may, in order to calculate the current three-dimensional position of the object, inversely project the depth map onto a three-dimensional space from a current viewpoint associated with the current frame. The current viewpoint may be associated with a position and an orientation of the wearable device at a time instance when the current frame is rendered. FIG. 3 illustrates an example data flow for frame extrapolation. As an example and not by way of limitation, illustrated in FIG. 3, the operating system 220 of the computing system 108 may access a UV depth map 311 associated with a rendered image corresponding to frame N. The UV depth map 311 may be a mapping of depth information to a two-dimensional screen position. In particular embodiments, the UV depth map 311 may be a two-dimensional map on UV coordinates. The operating system 220 of the computing system 108 may calculate a three-dimensional position 314 of an object in the rendered image corresponding to frame N by performing inverse projection of the UV depth map 311 onto a three-dimensional space from a viewpoint associated with frame N. The inverse projection may be performed by applying an inverse of ViewProjection matrix 313 corresponding to frame N to the UV depth map 311. Although this disclosure describes calculating a current three-dimensional position of an object presented in the rendered image in a particular manner, this disclosure contemplates calculating a current three-dimensional position of an object presented in the rendered image in any suitable manner.

In particular embodiments, the operating system 220 of the computing system 108 may calculate a past three-dimensional position of the object corresponding to a past frame using the motion vector data and the depth map. To calculate the past three-dimensional position of the object, the operating system 220 of the computing system 108 may generate an estimated depth map corresponding to the past frame by subtracting the motion vectors from the depth map. The operating system 220 of the computing system 108 may inversely project the estimated depth map onto a three-dimensional space from a past viewpoint associated with the past frame. As an example and not by way of limitation, continuing with a prior example illustrated in FIG. 3, the operating system 220 of the computing system 108 may estimate a depth map 321 corresponding to frame N−1 by subtracting the motion vector 312 corresponding to frame N from the UV depth map 311 corresponding to frame N. The operating system 220 of the computing system 108 may calculate a three-dimensional position 324 of the object corresponding to frame N−1 by performing inverse projection of the estimated UV depth map 321 corresponding to frame N−1 onto the three-dimensional space from a viewpoint associated with frame N−1. The inverse projection may be performed by applying an inverse of ViewProjection matrix 323 corresponding to frame N−1 to the estimated UV depth map 321 corresponding to frame N−1. Although this disclosure describes calculating a past three-dimensional position of the object corresponding to a past frame in a particular manner, this disclosure contemplates calculating a past three-dimensional position of the object corresponding to a past frame in any suitable manner.

In particular embodiments, the operating system 220 of the computing system 108 may estimate a future three-dimensional position of the object corresponding to a future frame based on the past three-dimensional position and the current three-dimensional position of the object. Estimating the future three-dimensional position of the object based on the past three-dimensional position of the object and the current three-dimensional position of the object may be called Space Warp. Estimating the future three-dimensional position of the object may be performed based on an assumption that the object moves at a constant speed from a time instance corresponding to the past frame to a time instance corresponding to the future frame. The operating system 220 of the computing system 108 may perform a linear interpolation to estimate the future three-dimensional position of the object. As an example and not by way of limitation, continuing with a prior example illustrated in FIG. 3, the operating system 220 of the computing system 108 may estimate a three-dimensional position 334 of the object based on the calculated three-dimensional position 314 of the object corresponding to frame N and the estimated three-dimensional position 324 of the object corresponding to frame N−1. Although this disclosure describes estimating a future three-dimensional position of the object corresponding to a future frame based on the past three-dimensional position and the current three-dimensional position of the object in a particular manner, this disclosure contemplates estimating a future three-dimensional position of the object corresponding to a future frame based on the past three-dimensional position and the current three-dimensional position of the object in any suitable manner.

Figure 4:
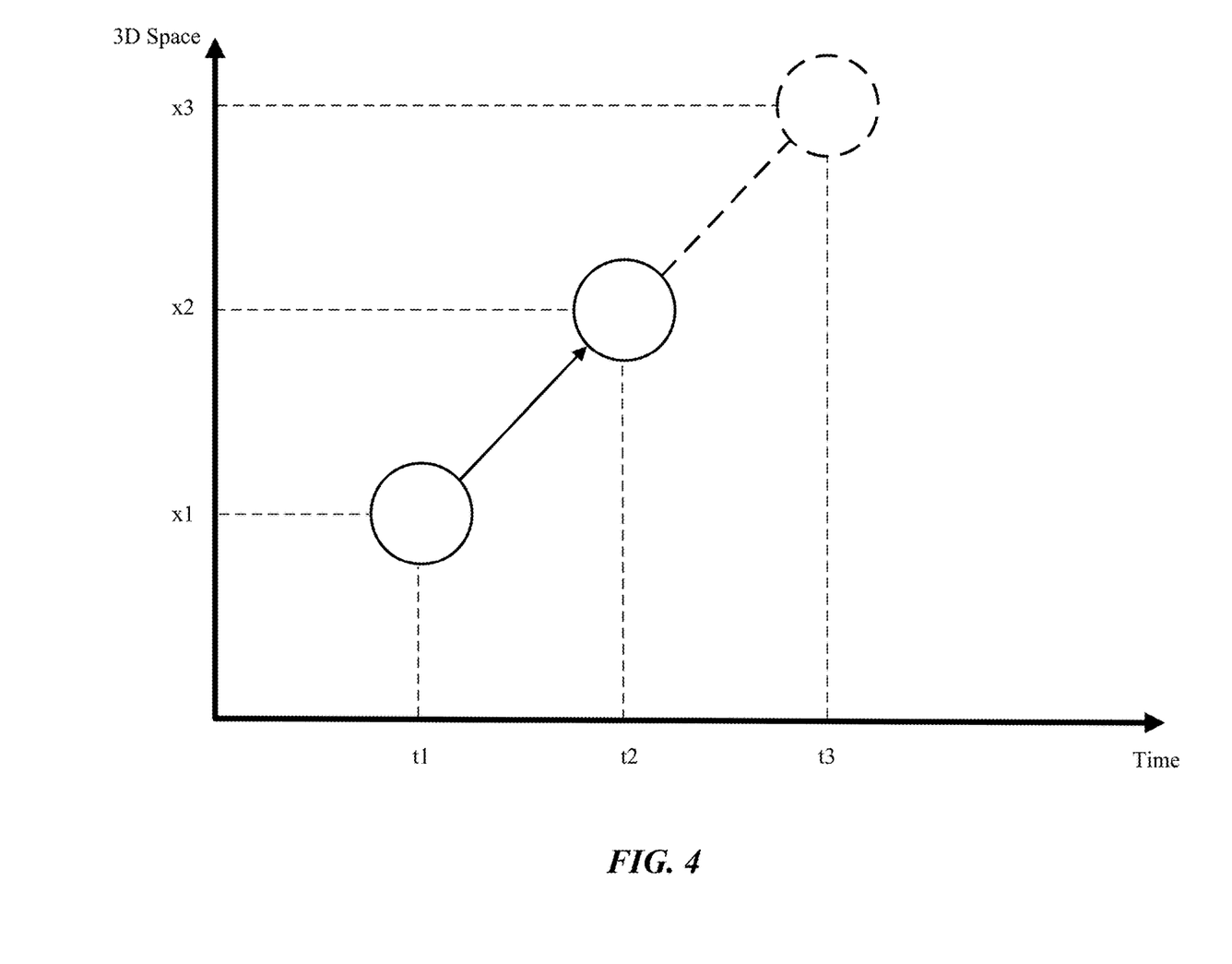
FIG. 4 illustrates an example estimation of a future position of an object based on a past position and a current position of the object.

FIG. 4 illustrates an example estimation of a future position of an object based on a past position and a current position of the object. In the example illustrated in FIG. 4, an object located at a three-dimensional position x1 at time t1 and locates at a three-dimensional position x2 at time t2. The operating system 220 of the computing system 108 may estimate a three-dimensional position x3 at time t3 by performing a linear interpolation, where x3=Lerp(x1, x2, (t3−t1)/(t2−t1)). Although this disclosure describes performing a linear interpolation to predict a three-dimensional position of an object based on previous positions in a particular manner, this disclosure contemplates performing a linear interpolation to predict a three-dimensional position of an object based on previous positions in any suitable manner.

In particular embodiments, the operating system 220 of the computing system 108 may generate a distortion mesh by reprojecting the estimated future three-dimensional position of the object onto the future viewpoint. As an example and not by way of limitation, continuing with a prior example illustrated in FIG. 3, the operating system 220 of the computing system 108 may generate a distortion mesh 337 by reprojecting the estimated three-dimensional position 334 of the object corresponding to frame N+1 onto the viewpoint corresponding to frame N+1. The reprojection may be performed by applying the estimated three-dimensional position 334 of the object with a ViewProjection matrix 335 corresponding to frame N+1. The ViewProjection matrix 335 may be acquired by re-fetching the pose of the headset 104. Although this disclosure describes generating a distortion mesh by reprojecting the estimated future three-dimensional position of the object onto the future viewpoint in a particular manner, this disclosure contemplates generating a distortion mesh by reprojecting the estimated future three-dimensional position of the object onto the future viewpoint in any suitable manner.

In particular embodiments, the operating system 220 of the computing system 108 may generate an extrapolated image corresponding to the future frame by reprojecting the object presented in the rendered image to a future viewpoint associated with the future frame using the future three-dimensional position of the object. To generate the extrapolated image, the operating system 220 of the computing system 108 may apply the distortion mesh to the rendered image. As an example and not by way of limitation, continuing with a prior example illustrated in FIG. 3, the operating system 220 of the computing system 108 may generate an image (not shown) corresponding to frame N+1 by applying the distortion mesh 337 to the rendered image (not shown) corresponding to frame N. The operating system 220 of the computing system 108 may present the generated image corresponding to frame N+1 to the display associated with the headset 104. Although this disclosure describes generating an extrapolated image corresponding to the future frame in a particular manner, this disclosure contemplates generating an extrapolated image corresponding to the future frame in any suitable manner.

Figure 5:
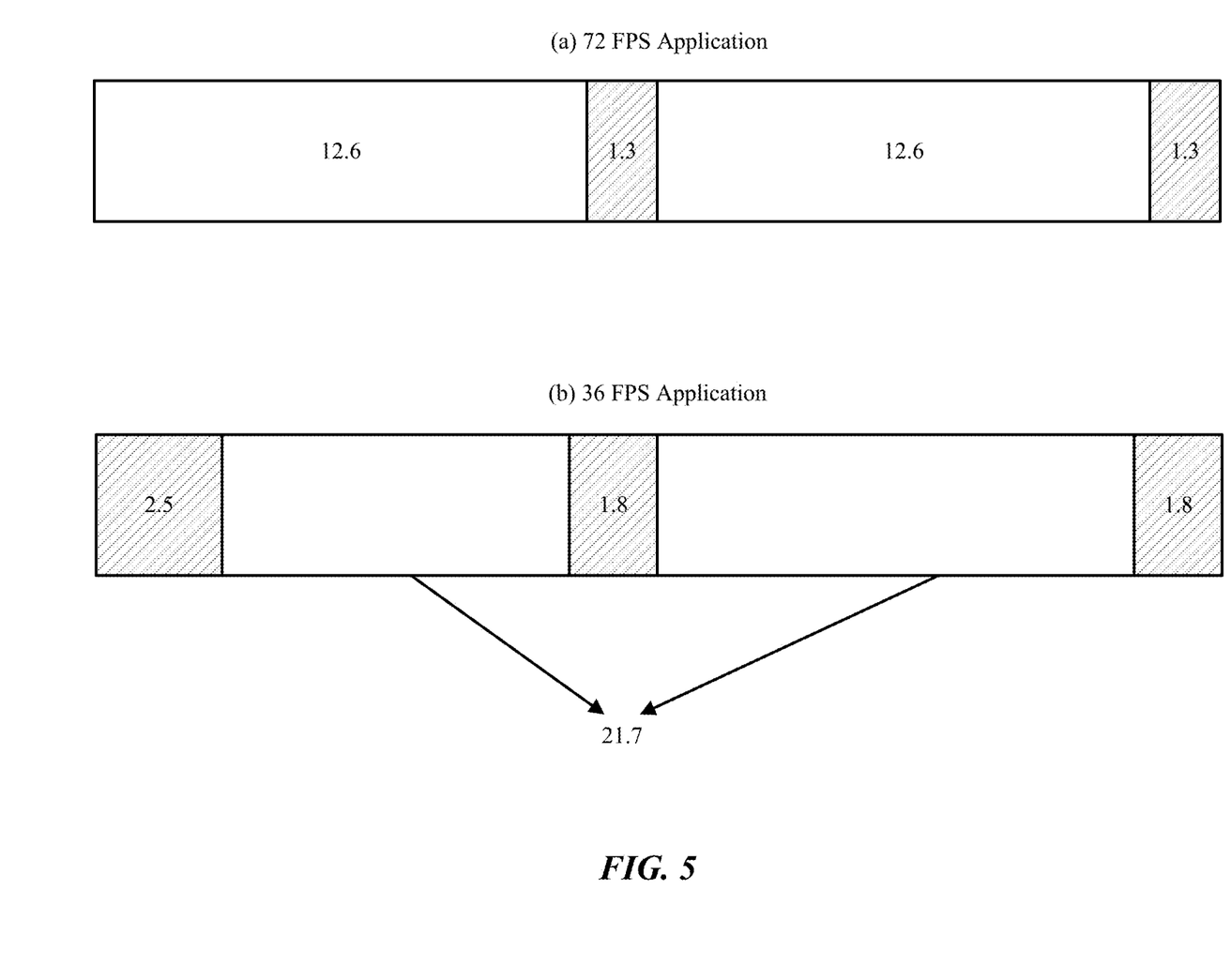
FIG. 5 illustrates an example comparison of time budget per frame between a full-frame rendering application and a half-frame rendering application.

FIG. 5 illustrates an example comparison of time budget per frame between a full-frame rendering application and a half-frame rendering application. In FIG. 5, (a) illustrates an application rendering images at 72 FPS, while (b) illustrates an application rendering images at 36 FPS. For the application in (b), additional 36 frames per second may be extrapolated using the invention disclosed herein. For the application in (a), a per-frame total budget may be 13.9 ms, which may need to be split between the application 210 and the operating system 220. For every frame, the operating system 220 may be performing composition work to push the rendered image onto screen in the backend. Since the application 210 and the operating system 220 may share the same Graphics Processing Unit (GPU), the application 210 may have 12.6 ms to use if the operating system 220 takes away 1.3 ms per vsync. Meanwhile, the application in (b) may have 27.8 ms per frame as the application renders at 36 FPS. With the frame extrapolation, the operating system 220 may consume a bit more time for vsync, e.g., 1.8 ms as illustrated in FIG. 5. Also, the application in (b) may spend additional time, e.g., 2.5 ms as illustrated in FIG. 5, for generating motion vectors. The application in (b) may have 21.7 ms of GPU time per frame, which is 71% more budget compared to the application in (a).

An application may need to render transparent objects. For example, the application may render a transparent object moving left, on top of an opaque object moving right. For a pixel that contains both objects, the motion vector may be ambiguous because the pixel is moving in both directions. However, the problem may not be too significant. When the transparent surface is far away from the camera, the projected motion may be very small from frame to frame. Also, a little motion jitter may be less noticeable for particle effects, a big use case of transparency rendering, because the effect often comes with fast animations, such as explosions. A problematic case for utilizing the frame extrapolation and reprojection may be a case where a near-field fast moving objects are transparent. An example for a near-field fast moving object would be the controllers 106. Thus, an object associated with the controllers 106 and any child objects of the controllers 106 may need to be non-transparent.

The frame extrapolation and reprojection may cause some degree of image distortion, especially on the background. When the background has rich texture patterns, the distortion may not be noticeable. However, when an object is moving on a clear background, the distortion caused by the frame extrapolation and reprojection may be noticeable to the users. A special consideration needs to be made to make the background more frame extrapolation friendly.

When an object is rotating fast, the frame extrapolation and reprojection may cause pixel distortion artifacts around the object. Imagine a cube is rotating around at about 100 revolutions per second. The cube's orientation from a frame to a next frame may seem more or less random because the motion vectors cannot be accurately constructed. To mitigate this problem, the application may disable a portion of motion vectors associated with the object rotation when the application detects a high-speed rotation during a motion vector generation phase.

Figure 6:
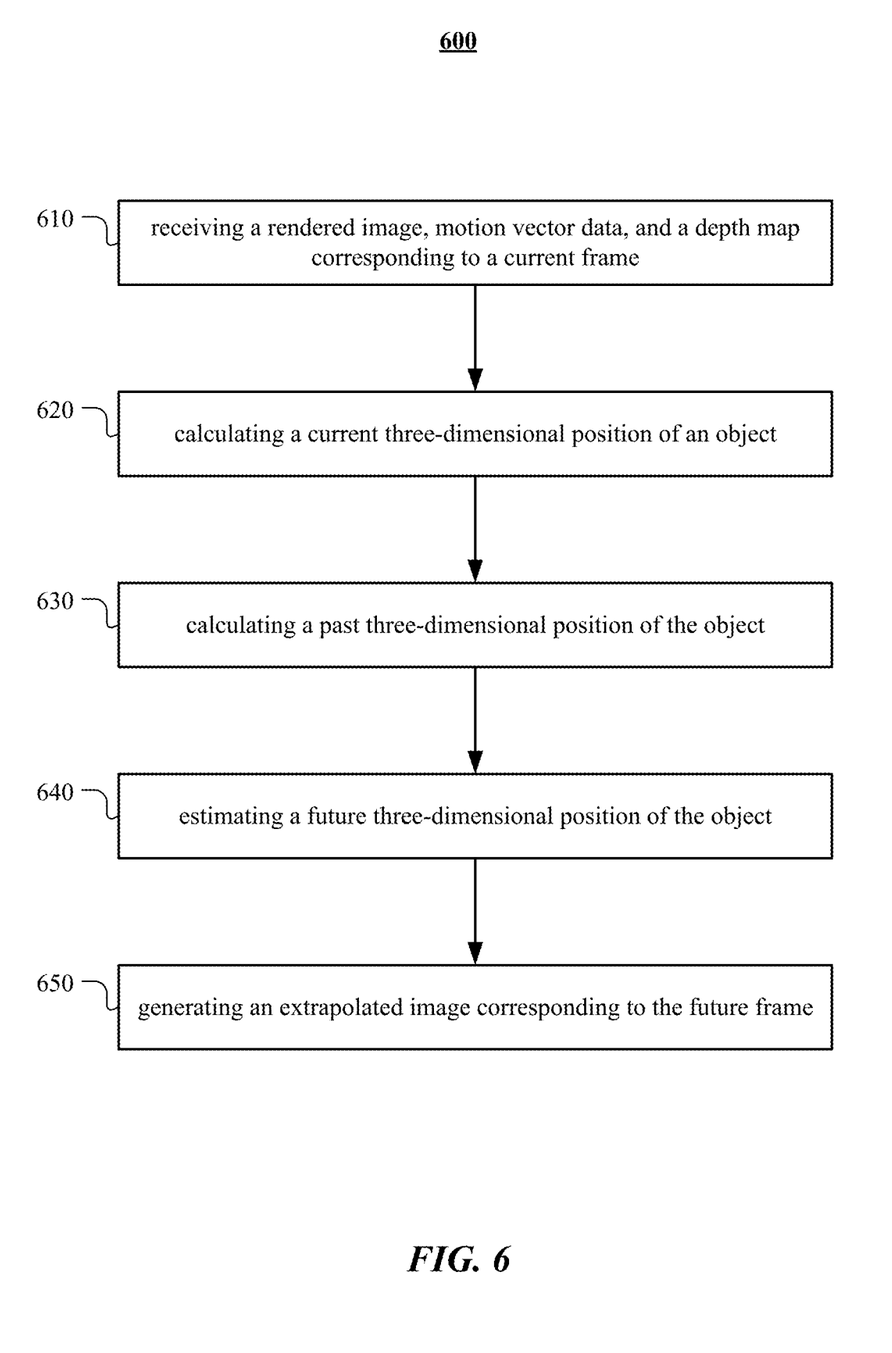
FIG. 6 illustrates an example method for extrapolating a frame based on application-generated motion vectors and a depth map.

FIG. 6 illustrates an example method 600 for extrapolating a frame based on application-generated motion vectors and a depth map. The method may begin at step 610, where the operating system of the computing system 108 may receive a rendered image, motion vector data, and a depth map corresponding to a current frame generated by an application. At step 620, the operating system of the computing system 108 may calculate a current three-dimensional position corresponding to the current frame of an object presented in the rendered image using the depth map. At step 630, the operating system of the computing system 108 may calculate a past three-dimensional position of the object corresponding to a past frame using the motion vector data and the depth map. At step 640, the operating system of the computing system 108 may estimate a future three-dimensional position of the object corresponding to a future frame based on the past three-dimensional position and the current three-dimensional position of the object. At step 650, the operating system of the computing system 108 may generate an extrapolated image corresponding to the future frame by reprojecting the object presented in the rendered image to a future viewpoint associated with the future frame using the future three-dimensional position of the object. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for extrapolating a frame based on application-generated motion vectors and a depth map including the particular steps of the method of FIG. 6, this disclosure contemplates any suitable method for extrapolating a frame based on application-generated motion vectors and a depth map including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
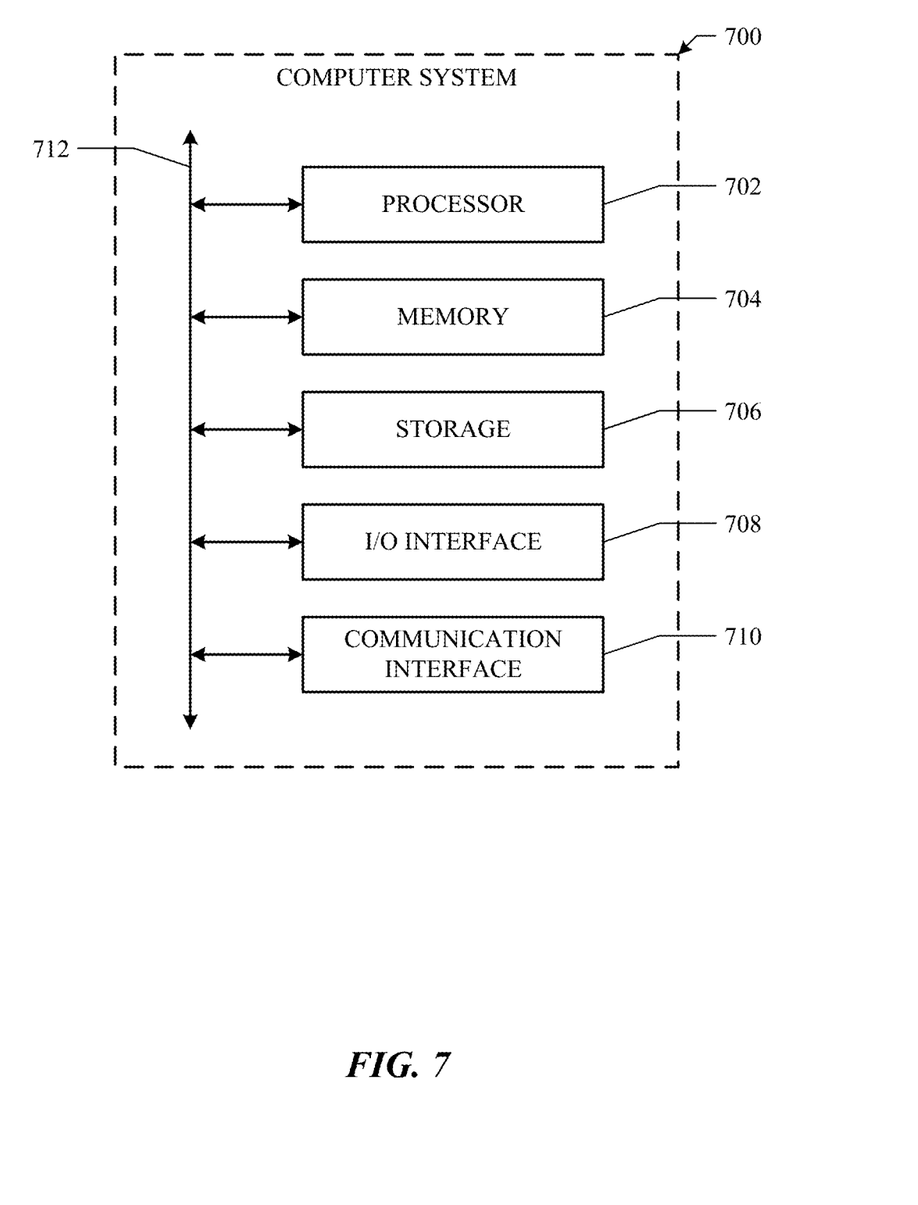
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing system, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system associated with a wearable device:
receiving a rendered image, motion vector data, and a depth map corresponding to a current frame of a video stream generated by an application;
processing the received motion vector data and the depth map such that regions corresponding to foreground of the rendered image are expanded;
calculating, for an object presented in the rendered image, a current three-dimensional position of the object corresponding to the current frame using the depth map;
calculating a past three-dimensional position of the object corresponding to a past frame using the motion vector data and the depth map;
estimating a future three-dimensional position of the object corresponding to a future frame based on the past three-dimensional position and the current three-dimensional position of the object; and
generating an extrapolated image corresponding to the future frame by reprojecting the object presented in the rendered image to a future viewpoint associated with the future frame using the future three-dimensional position of the object.

2. The method of claim 1, wherein the motion vector data and the depth map are generated based on three-dimensional objects rendered by the application.

3. The method of claim 2, wherein motion vectors in the motion vector data are three-dimensional.

4. The method of claim 1, wherein calculating the current three-dimensional position of the object comprises inversely projecting the depth map onto a three-dimensional space from a current viewpoint associated with the current frame.

5. The method of claim 4, wherein the current viewpoint is associated with a position and an orientation of the wearable device at a time instance when the current frame is rendered.

6. The method of claim 1, wherein calculating the past three-dimensional position of the object comprises:
generating an estimated depth map corresponding to the past frame by subtracting the motion vectors from the depth map; and
inversely projecting the estimated depth map onto a three-dimensional space from a past viewpoint associated with the past frame.

7. The method of claim 1, wherein estimating the future three-dimensional position of the object is performed based on an assumption that the object moves at a constant speed from a time instance corresponding to the past frame to a time instance corresponding to the future frame.

8. The method of claim 7, further comprising generating a distortion mesh by projecting the estimated future three-dimensional position of the object onto the future viewpoint.

9. The method of claim 8, wherein generating the extrapolated image corresponding to the future frame comprises applying the distortion mesh to the rendered image.

10. One or more computer-readable non-transitory storage media embodying software that is operable when executed, by a computing system associated with a wearable device, to:
receive a rendered image, motion vector data, and a depth map corresponding to a current frame of a video stream generated by an application;
process the received motion vector data and the depth map such that regions corresponding to foreground of the rendered image are expanded;
calculate, for an object presented in the rendered image, a current three-dimensional position of the object corresponding to the current frame using the depth map;
calculate a past three-dimensional position of the object corresponding to a past frame using the motion vector data and the depth map;
estimate a future three-dimensional position of the object corresponding to a future frame based on the past three-dimensional position and the current three-dimensional position of the object; and
generate an extrapolated image corresponding to the future frame by reprojecting the object presented in the rendered image to a future viewpoint associated with the future frame using the future three-dimensional position of the object.

11. The media of claim 10, wherein the motion vector data and the depth map are generated based on three-dimensional objects rendered by the application.

12. The media of claim 11, wherein motion vectors in the motion vector data are three-dimensional.

13. The media of claim 10, wherein calculating the current three-dimensional position of the object comprises inversely projecting the depth map onto a three-dimensional space from a current viewpoint associated with the current frame.

14. The media of claim 13, wherein the current viewpoint is associated with a position and an orientation of the wearable device at a time instance when the current frame is rendered.

15. The media of claim 10, wherein calculating the past three-dimensional position of the object comprises:
generating an estimated depth map corresponding to the past frame by subtracting the motion vectors from the depth map; and
inversely projecting the estimated depth map onto a three-dimensional space from a past viewpoint associated with the past frame.

16. The media of claim 10, wherein estimating the future three-dimensional position of the object is performed based on an assumption that the object moves at a constant speed from a time instance corresponding to the past frame to a time instance corresponding to the future frame.

17. The media of claim 16, wherein the software is further operable when executed to: generate a distortion mesh by projecting the estimated future three-dimensional position of the object onto the future viewpoint.

18. A system comprising: one or more processors; and a non-transitory memory coupled to the processors comprising instructions executable by the processors, the processors operable when executing the instructions to:

receive a rendered image, motion vector data, and a depth map corresponding to a current frame of a video stream generated by an application;

process the received motion vector data and the depth map such that regions corresponding to foreground of the rendered image are expanded;

calculate, for an object presented in the rendered image, a current three-dimensional position of the object corresponding to the current frame using the depth map;

calculate a past three-dimensional position of the object corresponding to a past frame using the motion vector data and the depth map;

estimate a future three-dimensional position of the object corresponding to a future frame based on the past three-dimensional position and the current three-dimensional position of the object; and generate an extrapolated image corresponding to the future frame by reprojecting the object presented in the rendered image to a future viewpoint associated with the future frame using the future three-dimensional position of the object.

\* \* \* \* \*